United States Patent [19]

Azechi et al.

[11] Patent Number: 5,691,407
[45] Date of Patent: Nov. 25, 1997

[54] SILICONE RUBBER COMPOSITIONS FOR HIGH-VOLTAGE ELECTRICAL INSULATORS

[75] Inventors: Syuuichi Azechi; Takeo Yoshida, both of Usui-gun, Japan

[73] Assignee: Shin-Etsu Chemical Co., Ltd., Tokyo, Japan

[21] Appl. No.: 615,089

[22] Filed: Mar. 14, 1996

[30] Foreign Application Priority Data

Mar. 24, 1995 [JP] Japan .................................. 7-091866

[51] Int. Cl.$^6$ ............................................. C08K 3/10
[52] U.S. Cl. ........................... 524/437; 524/588; 524/786
[58] Field of Search ........................ 524/437, 588, 524/786

[56] References Cited

U.S. PATENT DOCUMENTS 3,965,065 6/1976 Elliott ................................ 260/37 SB
4,247,708 1/1981 Tsutsumi et al. ........................ 556/456
5,352,724 10/1994 Fujiki et al. ............................ 524/398

*Primary Examiner*—Margaret W. Glass
*Attorney, Agent, or Firm*—Millen, White, Zelano, & Branigan, P.C.

[57] ABSTRACT

A silicone rubber composition comprising (A) an organopolysiloxane having at least two aliphatic unsaturated hydrocarbon groups attached to a silicon atom, (B) finely divided silica, (C) aluminum hydroxide surface treated with silazanes, (D) an organohydrogenpolysiloxane having at least two hydrogen atoms attached to a silicon atom, and (E) a platinum catalyst is suitable for use as a high-voltage electrical insulator. The silicone rubber has durable high-voltage electrical insulating properties and is firmly bondable to core materials.

12 Claims, No Drawings

SILICONE RUBBER COMPOSITIONS FOR HIGH-VOLTAGE ELECTRICAL INSULATORS

BACKGROUND OF THE INVENTION

1. Field of the Invention

This invention relates to a silicone rubber composition which on heat curing provides silicone rubber serving as an improved high-voltage electrical insulator.

2. Prior Art

In general, high-voltage electrical insulating materials for use as insulators for power transmission lines are of porcelain or glass. In a pollutional environment as in seaside areas and industrial areas, there is a tendency that dust, salts and mist attach to the surface of high-voltage electrical insulators, causing leakage of current and dry band discharge leading to flashover.

In order to eliminate the drawbacks of porcelain and glass insulators, a number of proposals have been made. For example, U.S. Pat. No. 3,511,698 discloses a weatherable high-voltage electrical insulator comprising a member of a thermosetting resin and a platinum catalyst-containing organopolysiloxane elastomer. JP-A 198604/1984 corresponding to U.S. Pat. No. 4,476,155 proposes a one-part room temperature curable organopolysiloxane composition which is applied to the outer surface of an electrical insulator of glass or porcelain so that the electrical insulator may maintain its high electrical properties even in the presence of outdoor stresses such as moisture, air pollution and ultraviolet radiation.

JP-B 35982/1978 corresponding to U.S. Pat. No. 3,965,065 and JP-A 209655/1992 corresponding to U.S. Pat. No. 5,369,161 disclose that a silicone rubber composition with improved electrical insulation is obtained by heating a mixture of an organopolysiloxane capable of heat curing into silicone rubber and aluminum hydrate at temperatures above 100° C. for more than 30 minutes.

However, some silicone rubber materials used in the prior art techniques mentioned above are not yet fully satisfactory in high-voltage electrical insulation. Some other silicone rubber materials require an undesirably long time for curing. Also it is believed in the prior art that if platinum catalysts are used in curing silicone rubber materials, the resulting silicone rubbers are deteriorated in electrical insulation. For avoiding such adverse impact, it has been often attempted to use organic peroxides instead of the addition curing type using platinum catalysts. However, the organic peroxide crosslinking system suffers from the problems of high reaction temperature, difficult control of the curing temperature as compared with the addition curing system, and decomposition residues left in a cured product after reaction which can adversely affect the properties of the cured product.

A variety of primers are used in joining silicone rubber to fiber-reinforced plastics, typically glass-reinforced epoxy resins, which are commonly used as the core of insulators and bushings. However, large amounts of aluminum oxide must be incorporated in order to improve electrical insulation. Upon prolonged exposure to severe outdoor conditions, moisture can penetrate to deteriorate the joint.

SUMMARY OF THE INVENTION

Therefore, an object of the present invention is to provide a novel and improved silicone rubber composition for use as a high-voltage electrical insulator which cures into a silicone rubber having improved high-voltage electrical insulating properties including weathering resistance, tracking resistance, arc resistance, and erosion resistance even in an application where the silicone rubber is exposed to serious air pollution and rigorous weather. Another object is to provide a silicone rubber composition which when applied to a core, maintains a strong bond with the core for a long period of time.

The present invention is directed to a silicone rubber composition comprising an organopolysiloxane of the average compositional formula (1) shown below having at least two aliphatic unsaturated hydrocarbon groups each attached to a silicon atom in a molecule as a main component and finely divided silica. The composition is of the addition curing type wherein the organopolysiloxane is cured with the aid of an organohydrogenpolysiloxane of the average compositional formula (2) shown below having at least two hydrogen atoms each attached to a silicon atom in a molecule and a platinum group catalyst. We have found that by blending a proper amount of surface treated aluminum hydroxide, especially aluminum hydroxide surface treated with a silazane in the silicone rubber composition, there is obtained a silicone rubber composition for use as a high-voltage electrical insulator which cures into a silicone rubber having improved high-voltage electrical insulating properties including weathering resistance, tracking resistance, arc resistance, and erosion resistance and maintains a strong bond with a core for a long period of time.

Accordingly, the present invention provides a silicone rubber composition for use as a high-voltage electrical insulator comprising (A) 100 parts by weight of an organopolysiloxane of the following average compositional formula (1):

$$R^1_a R^2_b SiO_{(4-a-b)/2} \quad (1)$$

wherein $R^1$ is a substituted or unsubstituted aliphatic unsaturated monovalent hydrocarbon group, $R^2$ is a substituted or unsubstituted monovalent hydrocarbon group free of an aliphatic unsaturated bond, and letters a and b are positive numbers in the range: $0<a\leq 1$, $1\leq b<3$, and $1<a+b\leq 3$, said organopolysiloxane having at least two aliphatic unsaturated hydrocarbon groups each attached to a silicon atom in a molecule, (B) about 1 to about 100 parts by weight of finely divided silica, (C) about 50 to about 300 parts by weight of surface treated aluminum hydroxide, (D) an organohydrogenpolysiloxane of the following average compositional formula (2):

$$R^3_c H_d SiO_{(4-c-d)/2} \quad (2)$$

wherein $R^3$ is a substituted or unsubstituted monovalent hydrocarbon group exclusive of an aliphatic unsaturated group, and letters c and d are positive numbers in the range: $1\leq c<3$, $0<d\leq 1$, and $1<c+d\leq 3$, said organohydrogenpolysiloxane having at least two hydrogen atoms each attached to a silicon atom in a molecule, in a sufficient amount to provide about 0.5 to about 20 mol of the silicon atom-attached hydrogen atom per mol of the aliphatic unsaturated hydrocarbon group in component (A), and (E) a catalytic amount of a platinum group catalyst.

DETAILED DESCRIPTION OF THE INVENTION

In the silicone rubber composition for use as a high-voltage electrical insulator according to the present invention, a first component (A) is an organopolysiloxane having at least two aliphatic unsaturated hydrocarbon groups each attached to a silicon atom in a molecule. It is represented by the following average compositional formula (1):

wherein $R^1$ is a substituted or unsubstituted aliphatic unsaturated monovalent hydrocarbon group, $R^2$ is a substituted or unsubstituted monovalent hydrocarbon group free of an aliphatic unsaturated bond, and letters a and b are positive numbers in the range: $0 < a \leq 1$, $1 \leq b < 3$, and $1 < a+b \leq 3$.

In formula (I), $R^1$ is a substituted or unsubstituted aliphatic unsaturated hydrocarbon group, preferably having 2 to 8 carbon atoms, more preferably 2 to 4 carbon atoms, for example, alkenyl groups such as vinyl, allyl, propenyl, and butenyl groups. $R^2$ is a substituted or unsubstituted monovalent hydrocarbon group free of an aliphatic unsaturated bond, preferably having 1 to 12 carbon atoms, more preferably 1 to 10 carbon atoms, for example, alkyl groups such as methyl, ethyl, propyl and butyl, cycloalkyl groups such as cyclohexyl, aryl groups such as phenyl and tolyl, aralkyl groups such as benzyl and phenylethyl, and substituted alkyl groups, typically halogen substituted alkyl groups such as 3,3,3-trifluoropropyl and 3-chloropropyl. Letters a and b are positive numbers satisfying the requirements: $0 < a \leq 1$, $1 \leq b < 3$, and $1 < a+b \leq 3$, preferably $0.001 \leq a \leq 0.5$, $1 \leq b < 2.5$, and $1.5 \leq a+b \leq 2.5$.

The organopolysiloxane (A) may have a linear, branched, cyclic or network molecular structure. No particular limit is imposed on molecular weight and any organopolysiloxanes from liquid ones having a low viscosity to raw rubber-like ones having a high viscosity are useful. However, in order for organopolysiloxanes to cure into rubbery elastomers, they should desirably have a viscosity of at least about 100 centipoise at 25° C., more desirably about 100 to about 1,000,000 centipoise at 25° C., most desirably about 1,000 to about 100,000 centipoise at 25° C.

Some illustrative examples of organopolysiloxane (A) are given below.

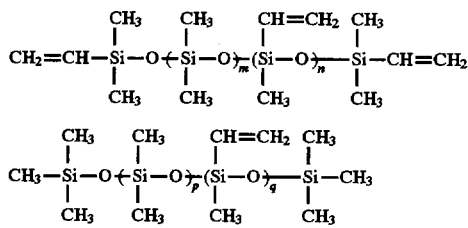

In these formulae, letters m and p are positive integers, n is a positive integer inclusive of 0, and q is a positive integer of at least 2, m+n and p+q are such numbers that these vinyl-containing organopolysiloxanes may have a viscosity within the above-defined range. The organopolysiloxanes may be used alone or in admixture of two or more.

A second component (B) is finely divided silica which may be any of those commonly used in conventional silicone rubber compositions. Preferred are precipitated silica, fumed silica and fired silica having a specific surface area of more than about 50 m²/g, especially about 50 to 400 m²/g as measured by a BET method as well as ground quartz and diatomaceous earth having a mean particle size of less than about 50 μm, especially about 0.1 to 20 μm. These fine powders may be used as such while hydrophobic silica which has been surface treated with organic silicon compounds, for example, organosilazanes such as hexamethyldisilazane, organohalogenosilane such as trimethylchlorosilane, organoalkoxysilane such as trimethylethoxysilane, organo(poly)siloxane such as hexamethyldisiloxane and methylpolysiloxane is also useful.

Component (B) is blended in an amount of about 1 to about 100 parts, preferably about 2 to about 50 parts by weight per 100 parts by weight of component (A). On this basis, compositions containing less than 1 part of component (B) are low in mechanical strength whereas the presence of more than 100 parts of component (B) inhibits high loading of component (C) or aluminum hydroxide.

A third component (C) is surface treated aluminum hydroxide which is effective for improving the electrical insulating properties of silicone rubber including arc resistance and tracking resistance. It is essential for the composition of the invention.

Aluminum hydroxide is generally represented by the formula (3).

$$Al_2O_3 \cdot 3H_2O \qquad (3)$$

Preferably aluminum hydroxide is in particulate form having a mean particle size of up to about 10 μm, especially about 0.5 to about 9 μm and a specific surface area of about 0.1 to 20 m²/g, especially about 0.5 to 10 m²/g as measured by a BET method.

Aluminum hydroxide is surface treated with suitable agents, for example, coupling agents such as silane, silazane, and titanate coupling agents, dimethylpolysiloxane fluids, and dimethylhydrogenpolysiloxane fluids.

Examples of the silane and silazane coupling agents include organosilazanes, for example, hexaorganodisilazanes such as hexamethyldisilazane, divinyltetramethyldisilazane, and diphenyltetramethyldisilazane; vinyl-containing (organo)alkoxysilanes such as vinyltriethoxysilane, vinyl-trimethoxysilane, divinyldimethoxysilane, and vinyltris(methoxyethoxy)silane; organochlorosilanes such as trimethylchlorosilane; aminosilanes such as trimethylaminosilane; epoxy functional group-containing organoalkoxysilanes such as glycidoxypropyltrimethoxysilane, glycidoxypropylmethyldiethoxysilane, and (epoxycyclohexyl)ethyltrimethoxysilane; (meth)acryloxy functional group-containing organoalkoxysilanes such as methacryloxypropyltrimethoxysilane and methacryloxypropyltriethoxysilane; and alkoxysilanes containing an unsubstituted or halo-substituted alkyl group such as dimethyldimethoxysilane, trimethylethoxysilane, and chloropropyltrimethoxysilane.

Examples of the titanate coupling agent include tetraisopropyl titanate, tetra-n-butyl titanate, butyl titanate dimer, tetrastearyl titanate, triethanolamine titanate, titanium acetylacetate, titanium ethylacetoacetate, titanium lactate, octylene glycol titanate, isopropyltristearoyl titanate, isopropyltridodecylbenzenesulfonyl titanate, isopropyltris (dioctylpyrophosphate) titanate, bis(dioctylpyrophosphate) oxyacetate titanate, and bis(dioctylpyrophosphate)ethylene titanate.

The dimethylpolysiloxane fluids which can be used in surface treatment of aluminum hydroxide are preferably nonfunctional cyclic and linear ones having a viscosity of about 0.65 to 100 centistokes at 25° C.

The organohydrogenpolysiloxane fluids which can be used in surface treatment of aluminum hydroxide are not particularly limited in molecular structure insofar as they have at least one, preferably at least two, hydrogen atoms attached to a silicon atom (that is, SiH group) in a molecule. They may have linear, branched, cyclic or three-dimensional network (resinous) molecular structures. They may be the same as a fourth component (D) to be described later. However, it is preferred to use linear organohydrogenpolysiloxanes of the following general formula (4):

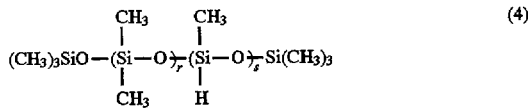

wherein letter r is a number of 0 to 50, preferably 0 to 25 and s is a number of 1 to 50, preferably 2 to 25. Siloxanes with r in excess of 50 would be too viscous to treat aluminum hydroxide therewith. Similarly siloxanes with s in excess of 50 would be too viscous to wet the surface of aluminum hydroxide.

Preferred among the above-mentioned surface treating agents are silazanes, especially hexaorganodisilazanes such as hexamethyldisilazane. The surface treatment of aluminum hydroxide particles with silazanes is effective for improving the adhesion of a silicone rubber composition to cores over a prolonged period of time and even after water immersion and for improving the tracking resistance of the composition.

In the practice of the invention, 100 parts by weight of aluminum hydroxide is preferably treated with about 1 to 50 parts by weight, especially about 5 to 30 parts by weight of the surface treating agent. Less than 1 part of the treating agent would be less effective for its purpose whereas more than 50 parts of the treating agent would be wasteful and add to the cost.

Surface treatment of aluminum hydroxide may be carried out by conventional well-known techniques. For example, aluminum hydroxide may be directly treated with the treating agent either previously or while mixing with other components. The previous direct treatment is preferred. More particularly, aluminum hydroxide particles and a treating agent are admitted into a mechanical mill closed under atmospheric pressure or a fluidized bed where they are mixed at room or elevated temperature, optionally in the presence of an inert gas. At the end of mixing, the aluminum hydroxide particles are dried. A catalyst corresponding to a particular treating agent may be used to promote the surface treatment.

Component (C) or treated aluminum hydroxide is blended in an amount of about 50 to about 300 parts, preferably about 150 to about 250 parts by weight per 100 parts by weight of component (A). On this basis, compositions containing less than 50 parts of component (C) cure into products which are less resistant to arc and tracking whereas loading of more than 300 parts of component (C) is difficult and adversely affects workability.

A fourth component (D) is an organohydrogenpolysiloxane which is a crosslinking agent for the silicone rubber composition of the invention. In the presence of a platinum group catalyst (E), hydrogen atoms attached to silicon atoms (that is, SiH groups) in component (D) undergo addition reaction or hydrosilylation with aliphatic unsaturated hydrocarbon groups (typically alkenyl groups) attached to silicon atoms in component (A) to induce crosslinking and curing.

The organohydrogenpolysiloxane (D) used herein should have at least two hydrogen atoms, preferably at least three hydrogen atoms each attached to a silicon atom in a molecule. It is represented by the general formula (2):

$$R^3{}_cH_dSiO_{(4-c-d)/2} \quad (2)$$

wherein $R^3$ is a substituted or unsubstituted monovalent hydrocarbon group exclusive of an aliphatic unsaturated group, and letters c and d are positive numbers in the range: $1 \leq c < 3$, $0 < d \leq 1$, and $1 < c+d \leq 3$. The organic groups represented by $R^3$ include, like $R^2$ mentioned above, substituted or unsubstituted monovalent hydrocarbon groups having 1 to 12 carbon atoms, preferably 1 to 10 carbon atoms, exclusive of aliphatic unsaturated groups, for example, alkyl groups such as methyl, ethyl and propyl, cycloalkyl groups such as cyclohexyl, aryl groups such as phenyl and tolyl, aralkyl groups such as benzyl and phenylethyl, and substituted alkyl groups such as 3,3,3-trifluoropropyl and 3-chloropropyl. Letters c and d are preferably positive numbers in the range: $1 \leq c < 2.5$, $0.001 < d \leq 0.5$, and $1.5 \leq c+d \leq 2.5$.

The organohydrogenpolysiloxane (D) may have a linear, branched, cyclic or three-dimensional network (resinous) molecular structure. It preferably has a viscosity of about 1 to about 10,000 centipoise at 25° C., more preferably about 3 to about 500 centipoise at 25° C. Some illustrative examples are given below.

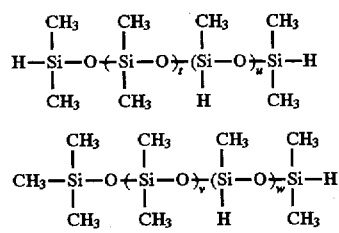

In the formulae, letters t, u and v are positive integers and w is an integer of 3 or more, and t+u and v+w are such numbers that the respective organohydrogenpolysiloxanes may have a viscosity within the above-defined range.

The organohydrogenpolysiloxane (D) is blended in a sufficient amount to provide about 0.5 to about 20 mol, preferably about 1 to about 3 mol of the hydrogen atom attached to a silicon atom (that is, SiH group) per mol of the unsaturated hydrocarbon group (typically alkenyl group) attached to a silicon atom in component (A). If the molar ratio of the silicon atom-attached hydrogen atom in component (D) to the silicon atom-attached unsaturated hydrocarbon group in component (A) is less than 0.5/1, a resulting silicone rubber composition will not fully cure. If the same ratio is above 20/1, a resulting silicone rubber composition can foam.

A fifth component (E) is a platinum group catalyst for promoting curing of the silicone rubber composition. It may be selected from conventional catalysts commonly used in hydrosilylation reaction, for example, chloroplatinic acid, alcohol solutions of chloroplatinic acid, complexes of chloroplatinic acid with olefins, platinum black, and platinum on supports. Catalyst (E) is used in a catalytic amount, typically about 0.1 to about 1,000 parts, preferably about 1 to about 500 parts by weight of metallic platinum per million parts by weight of the entire composition. Less than 0.1 ppm of platinum would not fully promote curing whereas more than 1,000 ppm of platinum is uneconomical.

If desired, various additives may be added to the silicone rubber composition of the invention depending on its intended application. Exemplary additives include metal oxides such as titanium oxide, iron oxide, cerium oxide, vanadium oxide, and chromium oxide, and nonfunctional linear dimethylpolysiloxane fluid. Pigments, heat resistance enhancers, flame retardants, and plasticizers may also be added insofar as they do not impair the desired properties. These additives may be added in conventional amounts insofar as the benefits of the invention are not lost.

The silicone rubber composition of the invention is obtained simply by uniformly mixing components (A) to (E) and optional components at room temperature. If desired, components (A) to (C) and optional components are mixed for about 2 to 4 hours in a planetary mixer or kneader while heating at about 100° to 200° C., and components (D) and (E) are then mixed with the mixture to complete a composition which is molded and cured. Depending on the viscosity of the mixture, any desired molding method may be selected from casting, compression molding, injection molding and transfer molding. Curing is generally completed by heating at about 80° to about 200° C. for about 3 minutes to about 3 hours.

The silicone rubber composition thus far described cures into a silicone rubber which has not only improved high-voltage electrical properties including tracking resistance and erosion resistance even in an application where the silicone rubber is exposed to serious air pollution and rigorous weather, but also weathering resistance, water repellency, and durable bond to cores. The silicone rubber is thus useful as high-voltage electrical insulators such as bushings.

EXAMPLE

Examples of the present invention are given below by way of illustration and not by way of limitation. All parts are by weight.

Synthesis Example

Particulate aluminum hydroxide having a mean particle size of 8 μm and a BET specific surface area of 2 cm$^2$/g was surface treated by admitting 100 parts of it into a Henschel mixer together with a surface treating agent, the type and amount (parts) of which are shown in Table 1. The contents were agitated and mixed for 2 hours and transferred to a tray where they were dried at 105° C. for 4 hours, obtaining surface treated aluminum hydroxide designated AlOH-1, AlOH-2, AlOH-3, and AlOH-4.

TABLE 1

|  | AlOH-1 | AlOH-2 | AlOH-3 | AlOH-4 |
|---|---|---|---|---|
| Aluminum hydroxide | 100 | 100 | 100 | 100 |
| Treating agent |  |  |  |  |
| Hexamethyldisilazane | 10 | 20 | — | — |
| Vinyltriethoxysilane | — | — | 10 | — |
| Titanium ethylacetate | — | — | — | 10 |

Examples 1–3

The following components were used in the amounts shown in Table 2.

(A) a dimethylpolysiloxane blocked with a dimethylvinylsiloxy group at each end and having a viscosity of 5,000 centipoise at 25° C.

(B) finely divided silica in the form of wet silica Nipsil LP (commercially available from Nihon Silica K.K.) having a BET specific surface area of 180 m$^2$/g (C) surface treated aluminum hydroxide AlOH-1 or AlOH-2

(D) methylhydrogenpolysiloxane of the formula (5) shown below (E) a 1% 2-ethylhexanol solution of chloroplatinic acid (F) ethynyl cyclohexanol as a reaction controller First components (A) to (C) were agitated and mixed in a planetary mixer at room temperature (25° C.), and the remaining components (D), (E) and (F) were then added to the mixture. Uniform mixing at room temperature yielded a silicone rubber composition. The composition was heated and cured at 120° C. for 10 minutes and then subjected to secondary curing at 200° C. for 4 hours, obtaining a silicone rubber sheet of 128 mm×44 mm×6 mm (thick).

Methylhydrogenpolysiloxane (D):

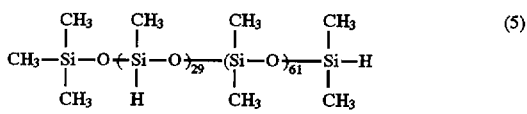

(5)

Example 4

Using surface treated aluminum hydroxide AlOH-1 as component (C), a silicone rubber composition was prepared as in Example 1 except that components (A) to (C) were agitated and mixed at 150° C. for 2 hours for heat treatment. A silicone rubber sheet was similarly obtained therefrom.

Example 5

Using untreated aluminum hydroxide and hexamethyldisilazane as component (C), a silicone rubber composition was prepared as in Example 1 except that components (A) and (B) were mixed with component (C) at room temperature for 1 hour and then agitated at 150° C. for 2 hours for heat treatment. A silicone rubber sheet was similarly obtained therefrom.

Example 6

A silicone rubber sheet was prepared as in Example 1 except that surface treated aluminum hydroxide AlOH-3 was used as component (C).

Example 7

A silicone rubber sheet was prepared as in Example 1 except that surface treated aluminum hydroxide AlOH-4 was used as component (C).

Comparative Examples 1–3

Silicone rubber sheets were prepared as in Example 1 except that the components were selected as shown in Table 2.

The silicone rubber sheets thus obtained were subject to a bonding test and tracking test. The results are shown in Table 2.

Durable bond test

A primer X-33-165A/B (commercially available from Shin-Etsu Chemical Co., Ltd.) was applied to a core of glass-reinforced epoxy resin and air dried. A silicone rubber composition was applied to the primed core. The primer and silicone rubber composition were simultaneously heat cured at 120° C. for 10 minutes. The bond between the core and the silicone rubber was visually examined both immediately after curing and after the sample was immersed in water containing 0.1% sodium chloride at 100° C. for 100 hours.

O: firmly bonding to all the surface of glass-reinforced epoxy resin

X: not bonding to all the surface of glass-reinforced epoxy resin, and partially or completely debonding

Tracking test

The test was according to the standard ASTM D-2303-64T. To a test assembly with an electrode-to-electrode distance of 50 mm under an applied voltage of 4 kV, a foul solution (an aqueous solution containing 0.1% of $NH_4Cl$ and 0.02% of nonionic surfactant) was applied dropwise from the upper electrode at a rate of 0.6 ml/min. A time taken until a track was created to turn conductive was measured. An erosion weight loss (% by weight) which represents a degree of deterioration of rubber sheet by heat and spark during the test was determined.

Erosion weight loss (wt %)=weight loss during erosion test/weight before erosion test×100%

TABLE 2

| Composition (pbw) | Example 1 | 2 | 3 | 4 | 5 | 6 | 7 | Comparative Example 1 | 2 | 3 |
|---|---|---|---|---|---|---|---|---|---|---|
| (A) dimethylpolysiloxane | 100 | 100 | 100 | 100 | 100 | 100 | 100 | 100 | 100 | 100 |
| (B) wet silica | 5 | 5 | 5 | 5 | 5 | 5 | 5 | 5 | 35 | 5 |
| (C) aluminum hydroxide | | | | | | | | | | |
| AlOH-1 | 200 | — | 100 | 200 | — | — | — | — | — | — |
| AlOH-2 | — | 200 | — | — | — | — | — | — | 10 | — |
| AlOH-3 | — | — | — | — | — | 200 | — | — | — | — |
| AlOH-4 | — | — | — | — | — | — | 200 | — | — | — |
| untreated AlOH | — | — | — | — | 200 | — | — | 200 | — | 100 |
| hexamethyldisilazane | — | — | — | — | 40 | — | — | — | — | — |
| (D) MeH-polysiloxane | 6 | 6 | 6 | 6 | 6 | 6 | 6 | 6 | 6 | 6 |
| (E) platinum catalyst | 0.2 | 0.2 | 0.2 | 0.2 | 0.2 | 0.2 | 0.2 | 0.2 | 0.2 | 0.2 |
| (F) reaction controller | 0.1 | 0.1 | 0.1 | 0.1 | 0.1 | 0.1 | 0.1 | 0.1 | 0.1 | 0.1 |
| Test | | | | | | | | | | |
| Durable bond test | | | | | | | | | | |
| As cured | O | O | O | O | O | O | O | O | O | O |
| After water immersion | O | O | O | O | O | O | O | X | O | X |
| Tracking time (hr.) | 16 | 18 | 8 | 21 | 16 | 14 | 13 | 8 | 1 | 2 |
| Erosion weight loss (wt %) | 0.06 | 0.06 | 0.30 | 0.05 | 0.05 | 0.06 | 0.05 | 0.04 | 5.05 | 1.08 |

As is evident from Table 2, the silicone rubber compositions within the scope of the invention offer silicone rubbers having improved adhesion durability, tracking resistance, and erosion resistance. Silicone rubber compositions which do not use surface treated aluminum hydroxide (Comparative Examples 1 and 3) are inferior in adhesion after water immersion. A silicone rubber composition which contains surface treated aluminum hydroxide, but in a smaller amount (Comparative Example 2) is low in tracking resistance.

Japanese Patent Application No. 91866/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicone rubber composition for use as a high-voltage electrical insulator comprising (A) 100 parts by weight of an organopolysiloxane of the following average compositional formula (1):

(1)

wherein $R^1$ is a halo-substituted or unsubstituted aliphatic unsaturated monovalent hydrocarbon group, $R^2$ is a halo-substituted or unsubstituted monovalent hydrocarbon group free of an aliphatic unsaturated bond, and letters a and b are positive numbers in the range: $0<a\leq 1$, $1\leq b<3$, and $1<a+b\leq 3$, said organopolysiloxane having at least two aliphatic unsaturated hydrocarbon groups each attached to a silicon atom in a molecule, (B) 1 to 100 parts by weight of finely divided silica based on 100 parts by weight of (A), (C) 50 to 300 parts by weight of surface treated aluminum hydroxide based on 100 parts by weight of (A), wherein the aluminum hydroxide is of the formula $Al_2O_{3hu}·3HO_2O$, (D) an organohydrogenpolysiloxane of the following average compositional formula (2):

(2)

wherein $R^3$ is a halo-substituted or unsubstituted monovalent hydrocarbon group exclusive of an aliphatic unsaturated group, and letters c and d are positive numbers in the range: $1\leq c<3$, $0<d\leq 1$, and $1<c+d\leq 3$, said organohydrogenpolysiloxane having at least two hydrogen atoms each attached to a silicon atom in a molecule, in a sufficient amount to provide 0.5 to 20 mol of the silicon atom-attached hydrogen atom per mol of the aliphatic unsaturated hydrocarbon group in component (A), and (E) a catalytic amount of a platinum group catalyst.

2. The silicone rubber composition of claim 1 wherein the aluminum hydroxide (C) has been surface treated with an organosilazane.

3. The silicone rubber composition of claim 2 wherein the organosilazane is a hexaorganodisilazane.

4. The composition of claim 1, wherein in the organopolysiloxane, (A), $R^1$ is an aliphatic unsaturated hydrocarbon group of 2 to 8 carbon atoms, $R^2$ is a halo-substituted or unsubstituted monovalent hydrocarbon group having 1 to 12 carbon atoms free of an aliphatic unsaturated bond.

5. The composition of claim 1, wherein the organopolysiloxane, (A), has a viscosity of about 100 to about 1,000,000 centipoise at 25° C.

6. The composition of claim 1, wherein the finely divided silica, (B), is precipitated silica, fumed silica or fired silica having a specific surface area of about 50 to 400 m²/g measured by the BET method or hydrophobic silica surface treated with an organic silicon compound.

7. The composition of claim 1, wherein the aluminum hydroxide, (C), is in particulate form having a mean particle size of about 0.5 to about 9 μm and a specific surface area of about 0.1 to 20 m²/g measured by the BET method.

8. The composition of claim 1, wherein the aluminum hydroxide, (C), is surface treated with a silane, silazane or titanate coupling agent or with a dimethylpolysiloxane or dimethylhydrogenpolysiloxane fluid.

9. The composition of claim 1, wherein the aluminum hydroxide, (C), is surface treated with a surface treating agent in an amount of about 1 to 50 parts by weight per 100 parts by weight of the aluminum hydroxide.

10. The composition of claim 1, wherein in the organohydrogenpolysiloxane, (D), $R^3$ is a halo-substituted or unsubstituted monovalent hydrocarbon group having 1 to 12 carbon atoms free of an aliphatic unsaturated bond.

11. The composition of claim 1, wherein the organohydrogenpolysiloxane, (D), has a molecular weight of about 1 to about 10,000 centipoise at 25° C.

12. A silicone rubber obtained by curing a composition according to claim 1.

* * * * *